(12) United States Patent
Roswech et al.

(10) Patent No.: US 8,715,446 B2
(45) Date of Patent: May 6, 2014

(54) LATENT SOLVENT-BASED MICROFLUIDIC APPARATUS, METHODS, AND APPLICATIONS

(75) Inventors: Todd Roswech, Ithaca, NY (US); Peng Zhou, Newtown, PA (US); Lincoln C. Young, Ithaca, NY (US)

(73) Assignee: Rheonix, Inc., Ithaca, NY (US)

( * ) Notice: Subject to any disclaimer, the term of this patent is extended or adjusted under 35 U.S.C. 154(b) by 291 days.

(21) Appl. No.: 13/010,014

(22) Filed: Jan. 20, 2011

(65) Prior Publication Data

US 2011/0162785 A1 Jul. 7, 2011

Related U.S. Application Data

(63) Continuation-in-part of application No. 10/964,216, filed on Oct. 13, 2004, now Pat. No. 7,608,160, and a continuation-in-part of application No. 12/033,958, filed on Feb. 20, 2008, now Pat. No. 7,837,821, and a continuation-in-part of application No. 12/539,797, filed on Aug. 12, 2009, now Pat. No. 8,057,629.

(60) Provisional application No. 61/296,580, filed on Jan. 20, 2010.

(51) Int. Cl.
*B32B 38/04* (2006.01)

(52) U.S. Cl.
USPC ............... 156/272.2; 156/272.8; 156/273.3; 156/273.7; 156/285; 422/502; 422/503

(58) Field of Classification Search
USPC .......... 422/50, 68.1, 500, 502, 503, 547, 551, 422/552; 156/272.2, 273.3, 273.5, 273.7, 156/285, 305, 311
See application file for complete search history.

(56) References Cited

U.S. PATENT DOCUMENTS

| | | | |
|---|---|---|---|
| 7,390,377 B1 * | 6/2008 | Wallow et al. ............. | 156/308.6 |
| 7,569,127 B1 | 8/2009 | Cho | |
| 7,666,285 B1 | 2/2010 | Cho et al. | |
| 2002/0195196 A1 * | 12/2002 | Peters et al. .............. | 156/308.6 |
| 2007/0117201 A1 | 5/2007 | Kweon et al. | |
| 2007/0141366 A1 | 6/2007 | Rivett et al. | |
| 2008/0138248 A1 | 6/2008 | Viovy et al. | |
| 2008/0274015 A1 | 11/2008 | Park | |
| 2009/0074623 A1 | 3/2009 | Park | |

(Continued)

OTHER PUBLICATIONS

Xuelin Zhu et al, Study of PMMA Thermal Bonding, Microsyst Technol (2007) 13: 403-407, Accepted Jan. 20, 2006, Published online Jun. 20, 2006, Springer-Verlag 2006.

(Continued)

*Primary Examiner* — Jill Warden
*Assistant Examiner* — Dwayne K Handy
(74) *Attorney, Agent, or Firm* — William Greener; Bond, Schoeneck & King, PLLC

(57) ABSTRACT

A latent solvent-based microfluidic apparatus and method involves laminate bonding of two non-elastomeric, cyclic olefin copolymer (COC) components having opposing surfaces to be bonded, wherein in a contacted state there is at least one interstitial space between the contacted surfaces, applying an organic latent solvent to at least one of the opposing surfaces, wherein the latent solvent is in an inactive state, contacting the two opposing surfaces together, actively removing the latent solvent from the at least one interstitial space; and adjusting a latent solvency parameter to activate the latent solvent, wherein the opposing contacted surfaces become bonded.

16 Claims, 2 Drawing Sheets

(56) References Cited

U.S. PATENT DOCUMENTS

| | | |
|---|---|---|
| 2009/0123611 A1 | 5/2009 | Bekele |
| 2009/0170189 A1 | 7/2009 | Park et al. |
| 2009/0227755 A1 | 9/2009 | DeVoe et al. |
| 2010/0175999 A1 | 7/2010 | Barlow et al. |

OTHER PUBLICATIONS

S. H. Ng et al, Thermally Activated Solvent Bonding of Polymers, Microsyst Technol (2008) 14:753-759, Accepted Oct. 29, 2007, Published online Nov. 15, 2007, Springer-Verlag 2007.

Laurie Brown, et al, Fabrication and Characterization of Poly(Methylmethacrylate) Microfluidic Devices Bonded Using Surface Modifications and Solvents, The Royal Society of Chemistry 2006, Accepted Nov. 11, 2005, First Published as an Advance Article on the web Dec. 5, 2005, www.rsc.org/loc, Lab Chip, 2006, 6, pp. 66-73.

Jayna J. Shah, et al, Capillarity Induced Solvent-Actuated Bonding of Polymeric Microfluidic Devices, Analytical Chemistry, vol. 78, No. 10, pp. 3348-3353, May 15, 2005.

* cited by examiner

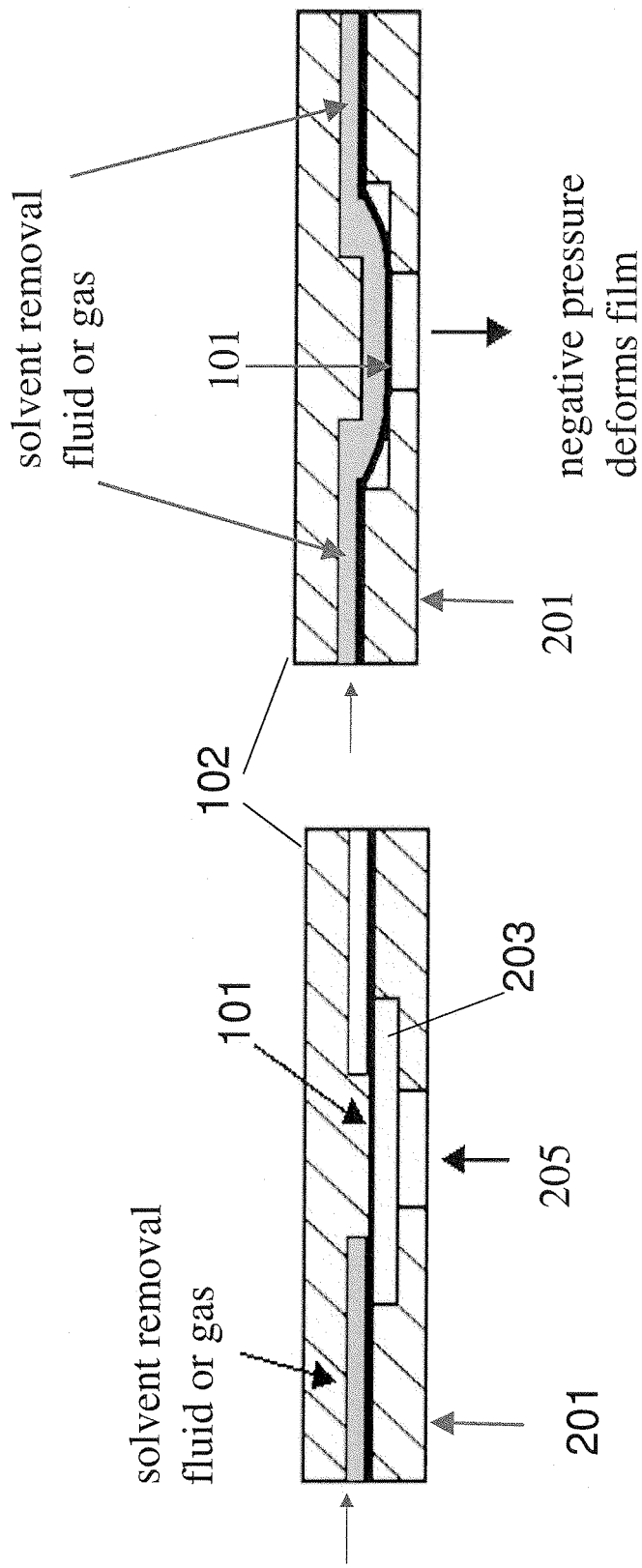

LATENT SOLVENT-BASED MICROFLUIDIC APPARATUS, METHODS, AND APPLICATIONS

CROSS-REFERENCE TO RELATED APPLICATIONS

This application is a continuation-in-part application filed under 37 CFR 1.53(b) of U.S. Ser. No. 10/964,216 filed on Oct. 13, 2004, and claims priority thereto as well as to U.S. application Ser. No. 12/033,958 filed on Feb. 20, 2008, U.S. application Ser. No. 12/539,797 filed on Aug. 12, 2009, and U.S. Provisional application Ser. No. 61/296,580 filed on Jan. 20, 2010, the subject matter of all of which are incorporated herein by reference in their entireties to the fullest allowable extent.

STATEMENT REGARDING FEDERALLY SPONSORED RESEARCH OR DEVELOPMENT

Not applicable.

BACKGROUND OF THE INVENTION

1. Field of the Invention

Embodiments of the invention generally pertain to the field of microfluidics, more particularly to laminated polymeric microfluidic structures and to methods for laminating polymeric microfluidic structures and, most particularly to latent solvent-based microfluidic apparatus, methods and applications.

2. Description of Related Art

The technology of manipulating minute volumes of biological and chemical fluids is widely referred to as microfluidics. The realized and potential applications of microfluidics include disease diagnosis, life science research, biological and/or chemical sensor development, and others appreciated by those skilled in the art.

A microfluidic structure including a substrate having one or more microfluidic channels or pathways and a cover plate (of a similar or different thickness as the substrate or thin film) or a second or more substrates, films, membranes, etc., some of which may contain fluid pathways, reservoirs, etc. that may or may not be interconnected, may commonly be referred to as a microfluidic chip. Highly integrated microfluidic chips are sometimes called 'labs on a chip'. Inorganic microfluidic chips having substrates made of glass, quartz or silicon have advantageous organic solvent compatibilities, high thermal and dimensional stability and excellent feature accuracy. These chips are typically fabricated using well-established microfabrication technologies developed for the semiconductor industry. However, the material and production costs of the inorganic chips may become prohibitively high especially when the fluidic pathway(s) requires significant area or the chip has to be disposable. In addition, many established biological assays were developed compatible with the surface properties of polymeric substrates. The research effort required to redevelop these assays on inorganic surfaces would require significant time and resource investments.

As an alternative to inorganic microfluidic structures such as those referred to immediately above, microfluidic structures or devices can also be made from elastomeric materials (e.g., PDMS, silicone rubber (RTV))). Examples of such devices are disclosed, e.g., in Mathies et al., U.S. Pat. No. 7,445,926; K. Hosokawa, R. Maeda, A pneumatically-actuated three-way microvalve fabricated with polydimethylsiloxane using the membrane transfer technique, J. Micromech. Microeng. 10 (2000) 414-420. Elastomeric microfluidic structures have advantageous low material costs and the potential for mass production. However, the fabrication of elastomeric/polymeric microfluidic chips presents a variety of challenges. For example, microfluidic chips may contain sealed microstructures. They can be formed by enclosing a substrate having a pre-fabricated fluid pathway or other microfeatures with a thin cover plate, or with one or more additional substrates to form a three-dimensional fluid network. The pathways or other microstructures have typical dimensions in the range of micrometers to millimeters. This multilayer microfluidic structure is integrated, or may be joined together by various conventional techniques. These techniques include thermal, ultrasonic and 'strong'-solvent bonding well known in the art. As used herein and understood in the art, the effective use of a 'strong-solvent' bonding agent does not depend on thermal activation conditions or other environmental factors; rather, strong-solvents, per se, chemically melt the polymeric surface that they contact allowing two surfaces to be permanently attached together. Unfortunately, these techniques can significantly alter the mated surfaces and detrimentally distort or completely block the microfluidic pathways. This can be due, for example, to the low dimensional rigidity of polymeric materials exposed to strong-solvent bonding conditions.

The use of adhesives for lamination may circumvent some of these potential difficulties by avoiding the use of excessive thermal energy or a 'strong' organic solvent. However, the introduction of an adhesive layer to a wall surface of an enclosed fluid pathway can cause other fabrication and/or application problems. Commercially available adhesives tend to be conforming materials with typical applied thicknesses of 12-100 micrometers. The compressive force required to produce a uniform seal between component layers will often extrude the adhesive into the fluid pathways resulting in microchannel dimensional alteration or obstruction. An additional potential problem with using adhesives is the formation of an adhesive wall within the enclosed microstructure. The presence of this dissimilar material makes uniform surface modification of the microstructure difficult. Furthermore, the manipulation or patterning of an adhesive layer is difficult, limiting the use of the adhesives to uniform continuous sheets or layers between two opposing planar surfaces. This restricts fluidic communication through a network to one planar surface, as the fluid cannot flow through the adhesive layer, preventing the use of a more versatile three-dimensional space.

The use of a strong organic solvent to join two or more discrete, non-elastomeric (or 'rigid' as opposed to 'rubbery' elastomeric characteristics) plastic parts is a well known practice in the art. In solvent welding, as this process is referred to, lamination solvents work by aggressively penetrating the macromolecular matrix of the polymeric component. This loosens the macromolecule-to-macromolecule bonds, uncoiling or releasing them from their polymer network to generate a softened surface. When two opposing softened surfaces are brought into close proximity, new macromolecular interactions are established. After the solvent evaporates there is a newly formed macromolecular network at the bonded interface with mechanical strength defined by the force of the macromolecular interaction. Exemplary strong organic solvents used for plastic component lamination include ketones (acetone, methylethyl ketone or MEK), halogenated hydrocarbons (dichloromethane, chloroform, 1,2-dichloroethane), ether (tetrahydrofurane or THF) or aromatic molecules (xylene, toluene) and others known by those skilled in the art. It is also known, however, that solvents are not universally solvent. Solvent ability depends upon the particular material to which it is applied as well as to the environmental conditions present during the application such as temperature, humidity, processing conditions, surface conditions (roughness, chemical modification, treatment or functionalization) etc.; thus water, the 'universal solvent,' will never be capable of gluing two plates of glass together in the context of 'solvent welding'.

The use of the aforementioned 'strong' solvents for bonding microfluidic chips with layers composed of polystyrene, polycarbonate or acrylic is problematic. All of the solvents known to be used in the field of solvent bonding are "strong" (as defined by their ability to dissolve the polymeric substrate) organic solvents. That is, these solvents tend to over-soften or dissolve the surface of the substrates during the bonding process even under 'normal,' i.e., ambient) conditions. The use of these strong solvents may damage the microfluidic structure by completely erasing, blocking or destroying the tiny fluid pathways when the layers are contacted. Acetone, dichloromethane or xylene, for example, begin to dissolve a polystyrene sheet within seconds of application at room temperature. Although it is possible to weaken the solvent strength by mixing the solvent with "inert" solvents such as methanol or ethanol, the resulting bond often does not provide a satisfactory result.

The contemporary patent literature discloses using thermal bonding, thermal-melting adhesive, liquid curable adhesive, and elastomeric adhesive approaches to enclose two opposing microfluidic structure surfaces of the same or different materials. It is suggested that these methods are applicable to the fabrication of microchannels of various shapes and dimensions. It is apparent, however, that these approaches rely on stringent control of the fabrication and process conditions, which may result in unacceptable fabrication throughput and production yield.

Another reported technique suggests that the quality of a thermally laminated polymeric microchannel can be drastically improved if the opposing substrates have different glass transition temperatures. While this approach may provide a way to retain microstructural integrity during thermal bonding, the success rate will rely on precise process control. Consequently, its application to microfluidic chip manufacturing is restricted.

A recent publication describes a method of creating a plurality of relief structures along the length of a microfluidic channel wall, projecting from the opposing surface in the non-functional area of the substrate. Subsequent deposition of a bonding material fills this relief structure, completing the bond. This method allegedly can increase the manufacturing yield of adhesive bonded microfluidic devices. The significant challenge of dispensing the correct volume of bonding material into the relief structures is not addressed. The necessary control of the small volume of bonding material does not lend itself to high production yields.

As disclosed herein and embodied in the claimed inventions of the priority documents referenced above, a 'weak' solvent such as but not limited to acetonitrile was utilized to irreversibly bond a thin (e.g., 25 μm) non-elastomeric membrane to a thicker (e.g., 100 μm) non-elastomeric substrate having microchannels in a surface thereof generally via introduction of the weak solvent onto or between the surfaces to be bonded and then thermally activating the system to form the bond. As mentioned, this proved to be effective, e.g., when acetonitrile was used to bond a thin polystyrene membrane to a thicker polystyrene, channeled substrate.

Two important considerations in the commercial success of microfluidics are cost-effective disposability and material compatibility of the chip with the fluid(s) running through it and the analyses being performed. Effects such as, but not limited to, clouding or the reduction of optical transparency may be highly deleterious. For example, polystyrene may not be the chip/system material of choice for all applications. Furthermore, when two polymeric microfluidic layers are solvent bonded where one layer must remain unbonded over a region of the other layer (e.g., a membrane over a valve seat in a substrate), residual solvent can collect around the perimeter of the unbonded region causing a deterioration of the material in the perimeter region that results in a bad seal and subsequent leakage conditions and failure of the microfluidic chip.

In view of the foregoing, the inventors have recognized the benefits and advantages of the ability to select and use the most efficacious microfluidic chip materials in a particular application that still meet the practical requirements of disposability, ease of manufacture, structural integrity, and other considerations known in the art. Accordingly, embodiments of the invention are directed to microfluidic structures and fabrication methods that address the recognized shortcomings of the current state of technology, and which provide further benefits and advantages as those persons skilled in the art will appreciate.

SUMMARY OF THE INVENTION

Embodiments of the invention pertain to the use and application of what is referred to herein as "solvent latency" in the context of solvent bonding of non-elastomeric polymeric materials especially in the field of microfluidic chips, devices, and systems. The term is intended to more precisely refer to a particular solvent being controllably 'inactive' (i.e., causing little or no swelling of the polymeric material) in one process state or under certain first process conditions) and controllably 'active' (i.e., causing swelling of the polymeric material) in another process state or under certain second process conditions. In various non-limiting aspects, solvent latency has a physical and temporal relativity to the target polymer, the physical state of the polymer as in surface characteristics that may influence or be influenced to provide for solvent latency (e.g., surface roughness or surface chemistry among other characteristics may be modified to adjust solvent activity), environmental conditions (e.g., temperature and humidity), or the presence or absence of an activating agent (e.g., laser, ultrasonics, radio frequency stimulation, diffusion of material into or out of a system).

Non-limiting, exemplary embodiments of the invention more particularly pertain to the application of solvent latency to the bonding of at least two of the same material non-elastomeric, polymeric components or layers (e.g., substrate and film) having a comparative thickness ratio equal to or greater than about 1.5:1. In various non-limiting, illustrative aspects, particular controllable solvent latency parameter values and/or ranges may include:

bond strength: 101% or greater than the shear strength of the film itself;

temperature: equal to or greater than about 30° C.;

humidity (relative): equal to or greater than about 20%;

activation time: equal to or greater than about one second and equal to or less than about 40 seconds;

applied pressure: equal to or greater than about 0.5 psi to less than the deformation pressure of the substrate.

In a non-limiting aspect, the embodied method of solvent latency involves selecting of material lamination layers and a solvent, and actively post-lamination-removing excess solvent from regions of the lamination layers that are not intended to be bonded, such as the film over fluidic or pneumatic channels in the substrate, over valve seats, reservoirs, and so on. For example, a heated platen press may be used in conjunction with a pressure orifice and a vacuum source to suck out excess solvent from open channels or regions (e.g., valve seat) between the substrate and the film being laminated thereto.

In various non-limiting aspects, the embodied method of solvent latency will be carried out on the basis of reported polymer-liquid (solvent) interaction parameters and solubility parameters such as the well recognized Hildebrand solubility parameter and Hansen solubility parameter. Thus based upon the understanding of the Hildebrand and Hansen solubility parameters by a person skilled in the art, various combinations of solvent/polymeric materials can be selected, which can be made to controllably interact in non-obvious ways under certain solvent latency conditions as disclosed herein. For example, a Hildebrand or Hansen solubility parameter can be used to help screen solvent/polymer systems under general room conditions for the thermodynamic potential of solvent activity. In practice, this may not address the kinetics of solvent swelling, which may be limited by diffusion (thus presenting a temporal condition) whereby a solvent, that may theoretically swell a polymer but exhibit solvent latency due to diffusion limits since the solvent is prevented from penetrating the bulk of the substrate as quickly as expected. Surface kinetics of the substrate are often much different, or can be made to be different, from the bulk material's kinetics with regard to solvency from chemical modification, roughing or functionalizing of the surface. Therefore, the surface may be affected to promote or delay solvency. There are a non-limiting number of ways to provide solvent latency in a solvent/polymer system, such as:

controlling process temperature and humidity (e.g., generally, the cooler the polymer/solvent the slower the solubility and the warmer, the faster . . . which is in practice, an approach to activation of a latent solvent;

diluting a solvent and/or blending multiple solvents;

modifying the surface to provide a diffusion limitation for the solvent (e.g., blocking, coating, or soaking the polymer in another fluid such as water, which would increase surface and near surface water content and by extension change solvent concentration or diffusion speed) or encouraging solvency by changing surface chemistry (e.g., plasma treatment);

changing surface physical structure (e.g., roughness). In an exemplary aspect, a latent solvent system may include:

polymer material(s) which may or may not be homogeneous;

a latent solvent or latent solvent blend, as a result of the polymer, polymer processing or modification, and/or process conditions;

an activation condition or process whereby the latent solvent provides swelling of the polymer, such as heat applied or heating of the interface (e.g., ultrasonics, RF, chemical reaction), time (as swelling may be suitably controlled by diffusion), concentration of solvent (e.g., evaporation of a diluting agent), chemical reaction (e.g., polymer solubility is provided by a latent solvent generated (directly or indirectly) by chemical reaction).

According to a non-limiting, illustrative aspect, substrate and film layers are a cyclic olefin copolymer (i.e., COC, COP) material and the solvent is 1,2-dichloroethane.

As set forth in the priority documents, a form of solvent latency was applied to a method for making a polymeric microfluidic structure in which two or more components (layers) of the microfluidic structure were fixedly bonded or laminated with a 'weak' organic solvent acting as a bonding agent. In an illustrative aspect, the weak solvent bonding agent was acetonitrile ($CH_3CN$, CAS No. 75-05-8), which was used as a weak solvent bonding agent to enclose a microstructure fabricated in or on a non-elastomeric polymer such as polystyrene, polycarbonate, acrylic or other linear polymer to form a three-dimensional microfluidic network. The method involved the steps of wetting at least one of the opposing surfaces of the polymeric substrate components with the weak solvent bonding agent in a given, lower temperature range, adjacently contacting the opposing surfaces, and thermally activating the bonding agent at a higher temperature than the lower temperature range for a given period of time. In an exemplary aspect, the lower temperature range was between about minus 10° to positive 30° C. The lower temperature range was within room temperature. Conditions, while the higher temperature was above about +20° C. and more typically in the range between about 25° to 45° C. In an aspect, pressure was applied to the adjacently contacted components to assist the laminating process. The higher temperature necessary for thermally activating the weak solvent bonding agent may depend on the lamination process and the applied pressure. Alternatively, the mass alone of the substrate may provide sufficient bonding force, or a vacuum may be pulled that is sufficient to bring the surfaces into uniform contact. Illustrative compression times of the lamination process ranged between about a few seconds when a roll laminator was used to about a few minutes when using a heated platen press, for example.

According to another aspect, the method was directed to producing a multi-layer microfluidic structure by repetitively applying a weak solvent bonding agent to opposing surfaces of multiple (n) substrate components that may include one or more microstructures. In an aspect, the multiple substrate components could be slidingly aligned after the selected surfaces were wetted and opposing surfaces put in adjacent contact, prior to thermally activating the bonding agent. According to another aspect, the alignment was carried out by vertically aligning and connecting discrete microstructures embedded at different substrate levels via vertically positioned through-holes in the substrate components.

According to another aspect, a polymeric, microstructural patterned substrate could be enclosed with a polymeric thin film bonded thereto with a weak solvent bonding agent that was thermally activated after the thin film contacted the substrate surface. According to this aspect, a contact surface of the substrate or the thin film was wetted with the weak solvent bonding agent prior to contact. Alternatively, the surfaces could be adjacently contacted and the weak solvent bonding agent applied to an exposed edge whence it is wicked between the surfaces. The structure can then be exposed to thermal activation heat and a compressing source such as a roll laminator for the bonding agent activation and bond formation. This method provided one aspect for the realization of large scale microfluidic chip production. In alternative aspects, the weak solvent may be applied via vapor phase or gas phase condensation processes known in the art. Rather than cooling the solvent, the substrate may be cooled prior to solvent application.

Another embodiment of the invention was directed to a laminated, polymeric microfluidic structure. In an aspect, the laminated microfluidic structure included a first component having first and second surfaces and one or more microstructures, and a second, polymeric component having first and second surfaces, in which the second component was fixedly attached to the first component by a weak solvent bonding agent. In a particular non-limiting aspect, the weak solvent bonding agent was acetonitrile. In various aspects, the second surface may be a polymeric thin film that encloses the microstructures on the first component. Alternatively, the laminated structure may include a plurality (n) of polymeric substrate components each having one or more microstructures that may or may not be interconnected. The components' surfaces may be planar and parallel, planar and non-parallel, or non-planar including conforming curvatures or other undulations.

The foregoing and other objects, features, and advantages of embodiments of the present invention will be apparent from the following detailed description of the preferred embodiments, which make reference to the several drawing figures.

BRIEF DESCRIPTION OF THE DRAWINGS

FIGS. 2A and 2B are cross sectional schematic images of a latent solvent system and method illustration according to an exemplary embodiment of the invention.

DETAILED DESCRIPTION OF AN EXEMPLARY EMBODIMENT OF THE INVENTION

Reference will now be made in detail to the present exemplary embodiments of the invention, examples of which are illustrated in the accompanying drawings. Wherever possible, the same reference numbers will be used throughout the drawings to refer to the same or like parts.

As used herein, the word "microstructure" generally refers to structural features on a microfluidic substrate component with walls having at least one dimension in the range of about 0.1 micrometer to about 1000 micrometers. These features may be, but are not limited to, microchannels, microfluidic pathways, microreservoirs, microreactors, microvalves or microfilters. The term "polymeric" refers to a macromolecular structure or material having a molecular weight that is substantially higher than the constituent monomers and, which is produced by a polymerization reaction. All materials commonly and herein referred to as "plastic" materials are polymeric materials. The term "acrylic" refers to Acrylite®, Plexiglas®, PMMA or other trade names of polymethylmethacrylate. A "two-dimensional microfluidic network" refers to fluidic connectivity of at least two microfluidic pathways or channels that co-exist within a component or in the plane of a planar component. A "three-dimensional microfluidic network" refers to fluidic connectivity of at least three microfluidic pathways or channels arranged in such a way that at least one of the three channels is out of the plane of the component or in another, non-planar component.

Figure 1B:
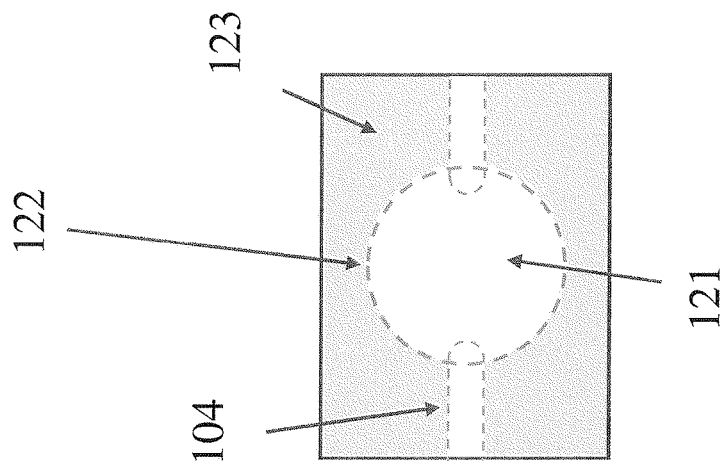
FIGS. 1A and 1B are sectional schematic images of a latent solvent system and method illustration according to an exemplary embodiment of the invention.
Figure 1A:
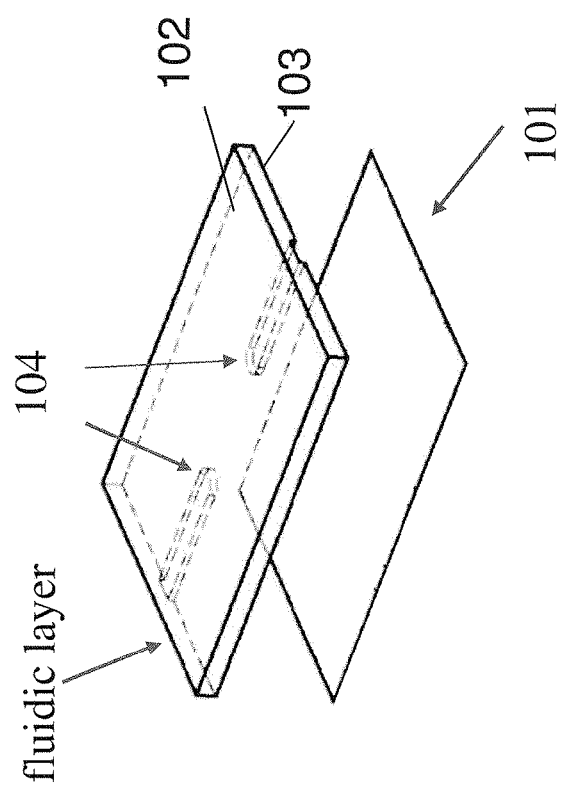

As shown in FIGS. 1A and 1B, a thin film 101 of a non-elastomeric polymeric material, e.g., a cyclic olefin polymer (COP) acting as an actuatable diaphragm, is to be bonded in plane to a planar surface of a similar COP substrate 102 in the gray area 123 shown in FIG. 1B. The underside surface 103 of the substrate has formed into it two disconnected microchannels 104 open on their outside ends. To allow fluid flow from one of the microchannels to the other, there must be an unbonded region of the film 121 as shown in FIG. 1B defined by the perimeter 122 of the unbonded region. When film that is bonded to the substrate surface is drawn away from the surface over the unbonded region, and if the film is not bonded in a region that intersects the interior ends of that at least two channels, then continuity can be achieved between the disconnected channels. However, the perimeter is often the region where excess solvent collects when the two planes of the layers are contacted and bonded. As shown in FIG. 1B, a diaphragm is formed and the excess solvent collects along the perimeter 122. If the excess solvent persists at the perimeter following the completion of bonding between the contacting surfaces of the substrate and film layers, the solvent may impair the mechanical integrity of the thinner layer and cause failure of the diaphragm in operation. In order to bond the film to the plane of the substrate and provide for unbonded regions, a solvent with particular characteristics relative to the film and substrate may be used. The solvent-substrate relationship may be stochastically developed and reference to, e.g., a solvent's particular Hildebrand or Hansen solubility parameter may be a useful reference for the latency potential of a particular solvent in relation to a particular substrate/film material. Another useful reference is "Polymer Handbook", Eds. Brandrup, J., Immergut, E. H., Grulke, E. A., 4th Edition, John Wiley, New York, 1999, VII/497-535, which provides an extensive guide to polymers and their physical, chemical, mechanical and optical characteristics as well as to solvents, non-solvents and solubility parameters related to the polymers described, the contents of which are incorporated herein by reference in their entirety.

As shown in FIGS. 2A and 2B, the process for bonding the deformable film 101 to the substrate 102 may be carried out on a specially prepared platen 201. The platen 201 has one or more voids 203 where there are intended to be unbonded regions of the film. The void(s) also includes an air pressure orifice 205 on the side of the platen opposite the void that is coupled to an externally actuatable pressure or vacuum source(s) (not shown). Prior to contacting the film to the plane of the substrate, a selected solvent is applied to at least one of the contacting surfaces. This can be done in a variety of ways such as spraying on, rolling on, flooding, or via capillary action. The film layer 101 is then laid on the platen 210 with the thicker substrate 102 aligned to the void(s) of the platen. Vacuum pressure is applied to the film 101 deforming it away from the plane of the substrate. The solvent's latency is then activated thereby forming a bond between the planes where the film remained undeformed. In an exemplary aspect, subsequent to the activation of the solvent but before the bonded system is removed from the platen, the interstitial spaces (channels, diaphragms or other open spaces such as reactors or reservoirs) are cleared of remaining solvent. The channels can be cleared by maintaining the deformation of the film thereby making continuities between all of the open space in the interior of the device and pushing or pulling atmospheric air, bottled gases, fluids or combinations of the above through the laminated device. The film may also be modulated or fluttered to provide a micro-pumping action to clear the interstitial regions of excess solvent. The removal of the remaining solvent terminates any residual solvent effect on the substrate and the film so that the mechanical integrity of the film remains intact.

EXAMPLE

Cyclic olefin copolymer (COC) material was used as the thicker substrate and the thinner film to be laminated together. 1,2-dichloroethane was selected as the latent solvent. Starting conditions (i.e., under which the latent solvent is in at least a temporarily inactive state) of an embodied latent solvent system were an environmental temperature of 21° C. (70° F.) and 35% relative humidity (RH). Under these conditions, the solvent has little or no effect on the COC within a period of time less than about 5 minutes. The activation process chosen in this example involves heating the laminae in a hot press to ~50° C. There may be a wide range of suitable temperatures and relative humidity that provide a suitable process window for this system, as one skilled in the art will recognize. The upper end of the process window would be defined by too great or too fast a solvent activity or otherwise unsuitable conditions for the desired result.

Selecting a latent solvent may occur in a number of different manners, such as using a Hildebrand or Hansen solubility parameter to help screen solvent/polymer systems under general room conditions for the thermodynamic potential of solvent activity. In practice, this may not sufficiently address the kinetics of solvent swelling, which may be limited by diffusion (thus presenting a temporal condition whereby a solvent may theoretically swell a polymer but exhibit solvent latency due to diffusion limits). Surface kinetics are often much different, or can be made to be different, from the bulk material kinetics with regard to solvency. Therefore, the substrate surface may also be affected to promote or delay solvency. There are a non-limiting number of ways to provide solvent latency in a solvent/polymer system, such as:

controlling process temperature and humidity (e.g., generally, the cooler the polymer/solvent the slower the solubility and the warmer, the faster);

diluting a solvent and/or blending multiple solvents;

modifying the substrate surface to provide a diffusion limitation for the solvent (e.g., blocking, coating, or soaking the polymer in another fluid such as water, which would increase surface and near surface water content and by extension change solvent concentration or diffusion speed), or encouraging solvency by changing surface chemistry (e.g., plasma treatment);

changing substrate surface physical structure (e.g., roughness).

In an exemplary aspect, a latent solvent system includes polymer material(s) which may or may not be homogeneous, and a latent solvent or latent solvent blend, as a result of the polymer, polymer processing or modification, process conditions, which provides little or no solvent activity under starting conditions. Therefore, an exemplary latent solvent system will utilize a solvent with little or no solvency with respect to the state of the polymer. A change of state of the system will activate the latency and allow the solvency to occur; e.g., an activation condition or process whereby the latent solvent provides swelling of the polymer, such as heat applied or heating of the interface by, e.g., ultrasonics, RF, chemical reaction), time (as swelling may be suitably controlled by diffusion), concentration of solvent (e.g., evaporation of a diluting agent), chemical reaction (e.g., polymer solubility is provide by a latent solvent generated (directly or indirectly) by chemical reaction).

Aspects of this invention may include a more general practice of polymer solvent lamination, in particular, when a degree of control of solvent activity is required; i.e., in some applications such as is required when bonding one or more of the polymer components in a thin film, or the desired result is a non-uniformly bonded surface, the latency of the solvent/polymer system may be controlled.

All references, including publications, patent applications, and patents cited herein are hereby incorporated by reference in their entireties to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening.

The recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not impose a limitation on the scope of the invention unless otherwise claimed.

No language in the specification should be construed as indicating any non-claimed element as essential to the practice of the invention.

It will be apparent to those skilled in the art that various modifications and variations can be made to the present invention without departing from the spirit and scope of the invention. There is no intention to limit the invention to the specific form or forms disclosed, but on the contrary, the intention is to cover all modifications, alternative constructions, and equivalents falling within the spirit and scope of the invention, as defined in the appended claims. Thus, it is intended that the present invention cover the modifications and variations of this invention provided they come within the scope of the appended claims and their equivalents.

We claim:

1. A method for laminating at least two non-elastomeric polymeric microfluidic components, comprising:
   a) providing two non-elastomeric polymeric components having opposing surfaces to be contacted, wherein in a contacted state there is at least one interstitial space between the contacted surfaces, further wherein the two non-elastomeric polymeric components are made of cyclic olefin copolymer (COC);
   b) applying an organic latent solvent to at least one of the opposing surfaces, wherein the latent solvent is in an inactive state, further wherein the organic latent solvent is 1,2-dichloroethane;
   c) contacting the two opposing surfaces together;
   d) actively removing the latent solvent from the at least one interstitial space;
   e) adjusting a latent solvency parameter to activate the latent solvent, wherein the opposing contacted surfaces become bonded.

2. The method of claim 1, wherein the at least one interstitial space comprises at least one of a microfluidic channel, a micro-pneumatic channel, a microfluidic valve seat, a microfluidic reservoir or reactor.

3. The method of claim 1, wherein the step of providing two polymeric components further comprises providing two components having a differential thickness ratio equal to or greater than 1.5:1.

4. The method of claim 3, wherein the thinner component has a thickness between about 20 to 30 micrometers (µm).

5. The method of claim 1, wherein the step of actively removing the latent solvent from the at least one interstitial space further comprises sucking out the latent solvent from the at least one interstitial space with a negative pressure.

6. The method of claim 1, wherein the latent solvency parameter is time and the step of adjusting the latent solvency parameter to activate the latent solvent consists of performing step (d) in a time between about one to 40 seconds (s).

7. The method of claim 1, wherein the latent solvency parameter is temperature and the step of adjusting the latent solvency parameter to activate the latent solvent consists of performing step (d) over an activation temperature of between about 40 to 80° C.

8. The method of claim 1, wherein the latent solvency parameter is relative humidity and the step of adjusting the latent solvency parameter to activate the latent solvent consists of performing step (d) over a relative humidity range between about 25 to 50%.

9. The method of claim 1, wherein the latent solvency parameter is pressure and the step of adjusting the latent solvency parameter to activate the latent solvent consists of performing step (d) over a pressure between about 1 psi to less than a deformation pressure threshold of the components.

10. The method of claim 1, wherein an inactive latent solvency parameter comprises a temperature of about 21° C. and a relative humidity of about 35%, and wherein the active latent solvency parameter comprises a temperature of about 50° C. and a relative humidity of about 35%.

11. The method of claim 1, further comprising changing a structural feature of the surface of at least one of the two non-elastomeric polymer components.

12. The method of claim 11, comprising roughening the surface of the at least one of the two non-elastomeric polymer components.

13. The method of claim 1, further comprising changing a surface chemistry feature of the at least one of the two non-elastomeric polymer components.

14. The method of claim 3, further comprising deforming the thinner one of the two components at least in a region of the at least one interstitial space such that the surface of the thinner one of the two components is disposed away from the surface of the other component in the region.

15. The method of claim 1, wherein the step of actively removing the latent solvent from the at least one interstitial space further comprises pushing out the latent solvent from the at least one interstitial space with a positive pressure.

16. The method of claim 3, wherein the step of actively removing the latent solvent from the at least one interstitial space further comprises modulating the position of the thinner layer over the interstitial region.

* * * * *